April 2, 1946.  K. RAUCH  2,397,504
MACHINE TOOL
Filed April 14, 1944 3 Sheets-Sheet 1
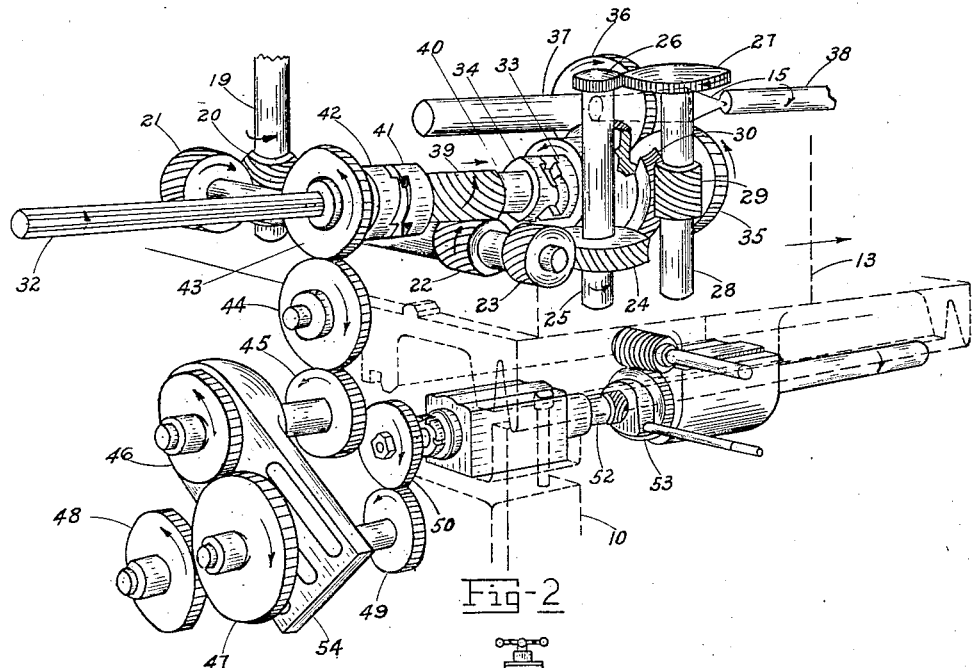
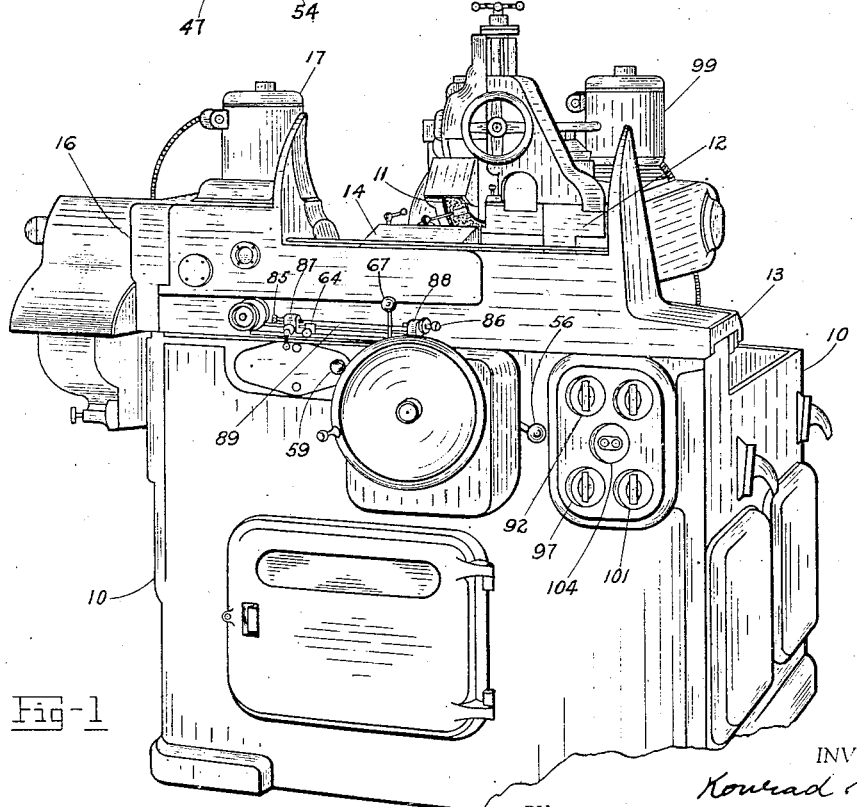
INVENTOR.
Konrad Rauch
Edward J. Noe
BY  ATTORNEY.

April 2, 1946.  K. RAUCH  2,397,504
MACHINE TOOL
Filed April 14, 1944  3 Sheets-Sheet 2
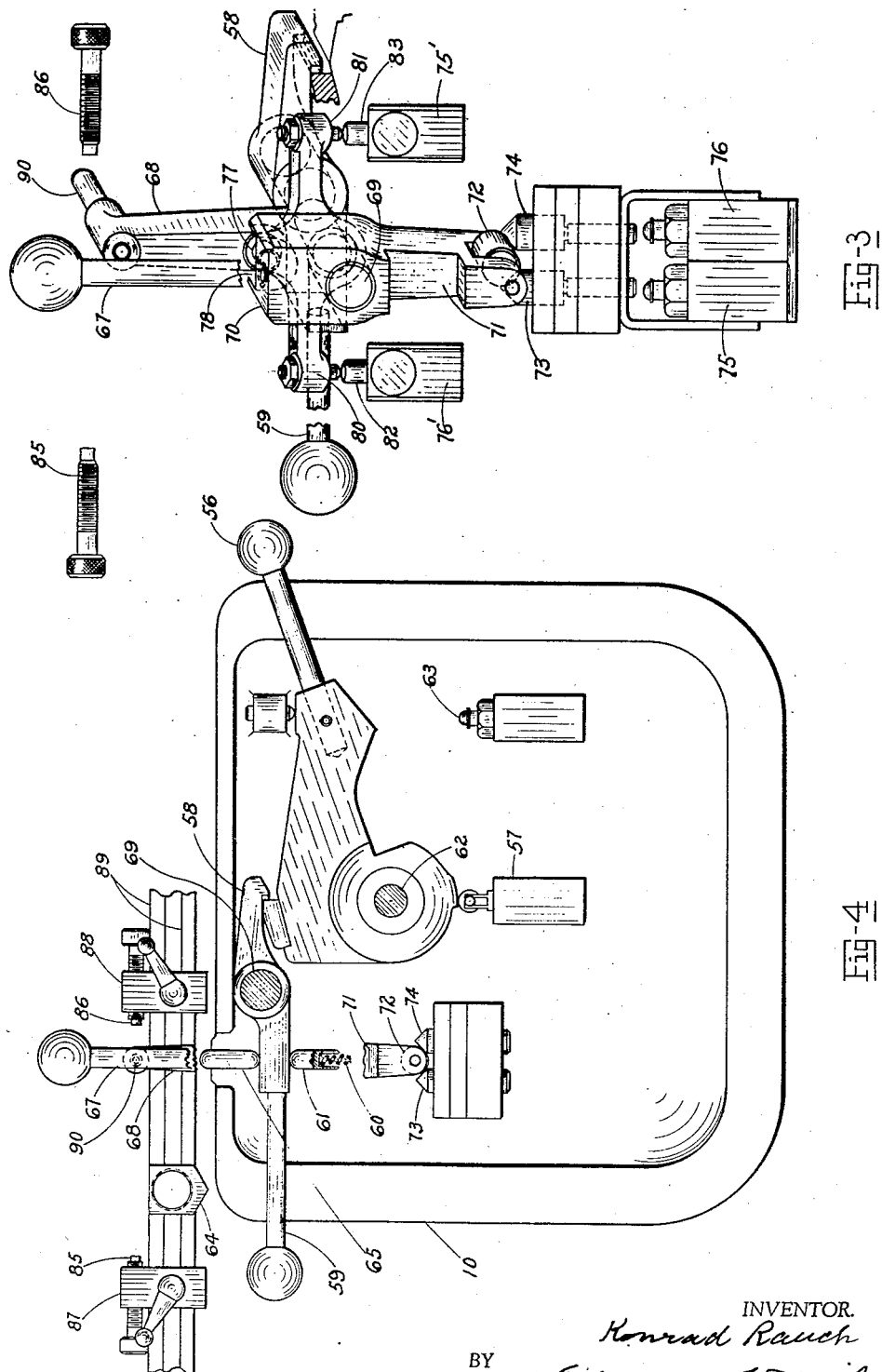
INVENTOR.
Konrad Rauch
BY Edward J. Noe Jr
ATTORNEY.

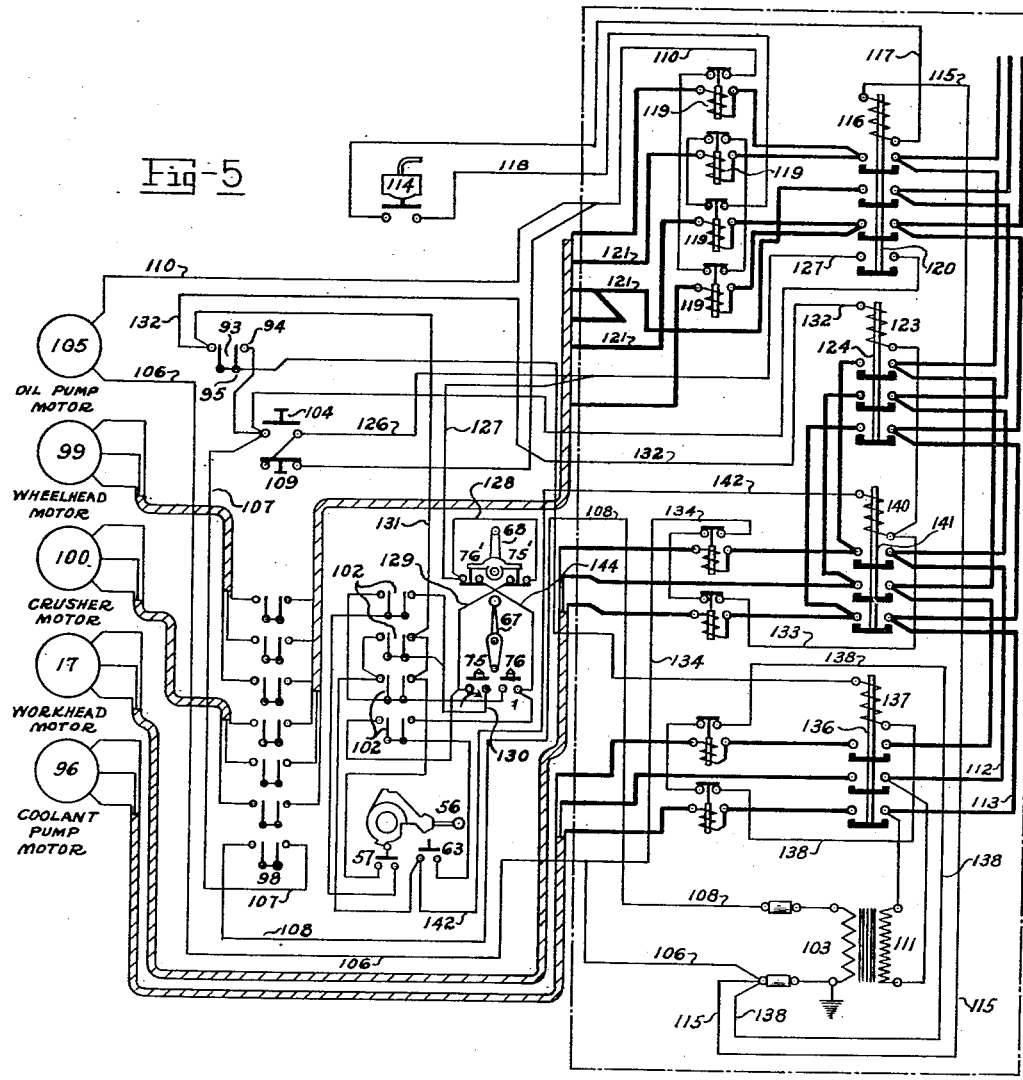

Patented Apr. 2, 1946

2,397,504

UNITED STATES PATENT OFFICE 2,397,504

MACHINE TOOL

Konrad Rauch, Dayton, Ohio, assignor to The Sheffield Corporation, Dayton, Ohio, a corporation of Ohio Application April 14, 1944, Serial No. 530,985

4 Claims. (Cl. 51—95)

This invention relates to machine tools and more particularly to thread grinding machines and the like in which a carriage such as a work holding table is arranged for feeding movement in either of a plurality of directions.

One object of the invention is the provision of a machine tool having a carriage feed for driving the carriage in a selected direction according to the manner in which power transmission gears are arranged, with controlling stops to determine the extent of feeding movement, together with a plurality of control members, associated through a lost motion connection, for starting and stopping the carriage movements and controlling switches in such a manner that one or the other of the stops causes movement of one or both of the switch control members to stop the feeding or return traversing movement of the carriage irrespective of the direction in which the carriage is traveling.

Another object is the provision of a machine tool having control means of the character mentioned, the two control members being arranged for movement in either direction from normal and determining the direction in which the feeding movement of the carriage takes place, each of the two control members having a switch included in the controlling circuit so that operation of either of the controlling switches, by one or the other of the two controlling members, will stop the feeding or traversing movement of the carriage.

Another object of the invention is to provide a convenient and practical control and switch arrangement for a motor driven traversing mechanism of the work holding carriage of a grinding machine, so arranged that a controlling lever may be moved from its normal position towards the right or the left to determine the direction of carriage feed and cooperate with stops on the carriage regardless of the direction in which the carriage is moving, to electrically disconnect the carriage drive.

Other objects and advantages of the invention will be apparent from the following description, the appended claims, and the accompanying drawings, in which, Fig. 1 is a perspective view of a grinding machine embodying the present invention;

Fig. 2 is a perspective diagrammatic showing of the driving mechanism for rotating the work and for feeding and traversing the carriage on which the work is supported;

Fig 3 is a perspective view showing the two feed controlling members one of which is arranged for manual operation while the other is controlled automatically to stop the feeding or traversing movements of the carriage;

Fig. 4 is a side elevation, partly in section, showing the controlling members and their association with the stops on the carriage;

Fig. 5 is a diagrammatic view showing the electrical connections of the various parts; and Fig. 6 is a diagrammatic showing the switch connections for manual control.

Referring more particularly to the drawings, in which the same reference numerals have been applied to like parts in the different views, 10 generally designates the base of a thread grinding machine which incorporates a motor driven grinding wheel 11 arranged on a wheel slide 12 which can be moved on the base towards and from the work axis. The base also supports the work holding carriage 13 which can travel towards the right or left as viewed in Fig. 1. This carriage has a tail stock 14 and a live center 15. In the driving head 16 is suitable transmission mechanism, driven by the work-head motor 17, for rotating the center 15 and for turning a lead screw which operates in a nut on the carriage to cause feeding and traversing movements of the carriage. The machine, in general, is of the character shown in Patent 2,060,438, granted November 10, 1936, insofar as the arrangement of the mentioned parts is concerned.

The driving mechanism in the work-head 16 is illustrated in Fig. 2. The work motor 17 drives a vertical shaft 19 having a worm 20 which turns worm wheel 21 and thus rotates worms 22 and 23. The worm 23 drives the worm gear 24, shaft 25, and gear 26 meshing with gear 27. The latter is on a shaft 28 having a worm 29 which meshes with worm gear 30. The latter rotates freely on a splined shaft 32 and is provided with a clutch face 33 adapted to be engaged by a clutch disc 34 which is splined on the shaft 32. When the clutch disc 34 and clutch face 33 are engaged, the worm wheel 30 rotates the spline shaft 32 comparatively slowly, causing corresponding rotational movements of a spur gear 35 fixed on the end of the spline shaft. Gear 35 meshes with a driving gear 36 fixed on the driving spindle 37 in which the live center 15 is provided. The work 38 is thus driven in the direction of the arrow at comparatively low speed of rotation, for feed movement.

During feed movement, the clutch disc 34 is held over against the clutch face 33 by a thrust toward the right as viewed in Fig. 2 on the helical gear 39 created by the pressure of gear 22 when the latter turns in a clockwise direction as viewed in that figure. This pressure holds the gear 39 against a collar 40 interposed between that gear and the clutch disc 34, collar 40 and gear 39 being freely rotatable on the splined shaft 32.

When the direction of rotation of shaft 19 is reversed, the gear 22 turns in a counter-clockwise direction and moves the slidable gear 39 towards the left to permit disengagement of the clutch disc 34 which has a fixed axial spacing from a clutch disc 41, and to cause driving engagement of clutch disc 41, fixed to gear 39, with the clutch face 42 on a gear 43 which is splined on the shaft 32. Under these conditions the splined shaft 32 is rotated at a comparatively high speed in a direction opposite to that shown by the arrows, causing corresponding rotation of the gear 35 and thus rotating the work rapidly in a reverse direction. This high speed rotation of the work takes place during a rapid traverse of the work supporting carriage, and the low speed operation of the work is produced during the comparatively slow feeding movement of the carriage in a selected direction, towards the right or left. The feeding and traversing mechanism for carriage 13 is driven from gear 43 which turns with the splined shaft 32 in one direction or the other.

The gear 43 is connected through gears 44, 45, 46, 47, 48, 49 and 50 to the feed screw 52 which is rotatably supported in suitable bearings on the machine base. The feed screw turns in a stationary nut 53 which is held on the work supporting carriage 13. If the nut is turned to a limited extent an accurate adjustment may be made in the position of the carriage, but during feeding movements of the carriage the nut is substantially fixed.

With one idler gear 47 interposed between the gears 46 and 48 the direction of rotation of the feed screw 52 will be opposite to the direction in which the spline shaft 32 turns. By adding a second idler gear between gears 46 and 47, as by swinging the carrying plate 54 to a lowered position, the feed screw 52 may be caused to turn in the same direction as spline shaft 32. As the work rotates in a given direction, it will thus be obvious that either right hand or left hand feeding movements of the work supporting carriage can be obtained dependent on whether one or two idler gears are interposed between the gears 46 and 48. As the gear 43 is splined on the shaft 32 and operates at comparatively high speed in one direction and at comparatively low speed in the other direction according to which one of the two driving clutches is engaged, it will be seen that a comparatively slow speed feeding movement may be given to the work carriage in either a right hand or a left hand direction, and a comparatively rapid traversing return will then take place in the opposite direction.

The grinding wheel may be moved manually towards the work axis by upward movement of an arm 56 into the position shown in Fig. 4. In this position it closes a switch 57 and opens a switch 63 which will be presently described. A latch arm 58 fixed to a handle 59 and yieldingly urged in a clockwise direction by a spring 60 and a spring pressed pin 61 serves to latch arm 56 in its raised position. By raising the arm 56 a threaded shaft 62 on which the arm is fixed is rotated against the action of a spring, not shown, and the slide that carries the grinding wheel is positively drawn towards the work and into a predetermined position. When the latch arm 58 releases arm 56 the spring which operates on the shaft 62 turns the latter, and moves the arm 56 back to its initial position which retracts the grinding wheel slide away from the work. Counter-clockwise movements of the latch arm 58 are caused manually, or automatically by a cam 64 adjustably secured on the work carriage 13. When the cam 64 reaches a vertically slidable pin 65 which is held in engagement with the upper side of arm 59, it presses the latter downwardly against the action of spring 60 and releases the lever 58.

The motor 17, which operates the feed screw and turns the work, is controlled by switches that are actuated manually and automatically by control arms 67 and 68 pivotally carried and independently movable on a shaft 69 that supports the latch arm 58 with its handle 59. Arm 67 is fixed to the hub portion 70 and a lever 71 which carries a roller 72 arranged to depress either one or the other of two spring pressed pins 73 and 74 controlling start switches 75 and 76 respectively. These switches are normally open, but one or the other is closed according to the direction in which the arm 67 is turned from its normal upright position.

The arm 68 is also pivotally movable on the shaft 69 and can be moved independently of arm 67 through a limited distance determined by a lost motion connection between these two arms. This connection comprises a pin 77 on the arm 68, projecting into a recess 78 in the hub portion 70 of arm 67. The width of this recess 78 is such that arm 67 can be moved far enough to depress the pin 73 or 74 while still leaving some small clearance between the pin 77 and the adjacent portion of the hub 70. Fixed on the arm 68 are two side arms 80 and 81 which bear against spring pressed plungers 82 and 83 which act to yieldingly center the arm 68. These plungers operate micrometric or precision switches 76' and 75' respectively, the switches being normally closed when arm 68 is in its normal upright position. However, as soon as the arm 68 is moved even through a fractional part of a degree, one or the other of these switches will be opened, clockwise movement of the arm 68, for example, opening the switch 75' without affecting switch 76'.

The arm 68 is automatically moved by stops 85 and 86 which are shown as threaded screws adjustably mounted in carrying blocks 87 and 88 which are adjustable along bars 89 fixed on the work carrying slide 13. As the slide moves towards the right or the left, one or the other of these stops 85, 86 comes into contact with a rearwardly extending pin 90 fixed on the arm 68 and projecting into the path of movement of the stops, the stop which is effective thus producing, to a limited degree, a turning movement of the arm 68 and opening the switch 75' or 76'. One or the other of these switches is in the motor energizing circuit, under normal conditions. Under abnormal conditions, where the switch that is opened by the stop on the carriage may not be the switch that controls the stopping of the work feeding or traversing motor, any continued movement of the arm 68 under the impelling movement of the stop swings the arm 68 still further, and brings the pin 77 against the side of the recess in arm 67, thus positively swinging the arm 67 which had been displaced towards that stop by the operator in initiating the carriage movements. The arm 67 is thus moved back to its normal position and opens the switch 75 or 76 that had been closed by this arm 67.

The switch 75 is in series with the switch 75' as will be apparent from Fig. 5, and switch 76 is in series with switch 76'. To initiate right hand feeding movement of the carriage, as in cutting a right hand thread, the arm 67 is moved towards the right from its normal position as viewed in Fig. 3, causing the switch 75 to close. This will produce slow rotation of the work in the direction of the arrow shown in Fig. 2, only the one idler gear 47 being interposed between gears 46 and 48 as indicated in Fig. 2. Movement of this arm 67 does not change the position of the arm 68 which remains in a centered position so that both switches 76' and 75' are closed. The stop 85 will ultimately come up against the pin 90, the stop having been positioned so as to stop the feeding movement at the proper time. Continued movement of the stop towards the right will swing the arm 68 clockwise, or towards the right as viewed in Fig. 3, pressing on the plunger 83 and opening the switch 75' which is in series with the switch 75 energized at the time. The motor energizing circuit is thus interrupted. The operator can then swing the arm 67 towards the left and close the switch 76 to produce rotation of the motor in the opposite direction, switch 76 being in series with the switch 76' which at this time remains closed. As soon as the carriage starts to travel toward the left, the stop 85 moves away from pin 90 and permits the arm 68 to center itself under the action of the spring pressed plungers 82 and 83.

Should the operator have applied two idler gears between the gears 46 and 48 and then move the arm 67 towards the right, thinking he was going to have a right hand movement of the carriage, the carriage would actually move towards the left. The stop 86, however, would be brought up against the pin 90 and first tilt the arm 68 counterclockwise and open the switch 76'. This switch at this time is not in circuit, so the carriage would continue its left hand movement and tilt the arm 68 still farther until the pin 77 comes up against the side of the recess in the hub 70 and then the arm 67 would be positively moved back to its upright position and open the switch 75 which at this time is the controlling switch. Regardless of the direction of movements of the stops 85 and 86, the arm 68 or both the arms 67 and 68 will be positively moved automatically in such a way as to open the switch which is at that time the controlling switch in the motor energizing circuit, and it will be impossible for the stop to mechanically injure the controlling mechanism.

The operation described has been with reference to a right hand movement of the carriage. The operation of the lever or levers by the proper stop at the end of the rapid traverse of the carriage will be apparent. To produce a left hand feeding movement of the carriage, for cutting a left hand thread, and with two idlers between the gears 46 and 48, the arm 67 is manually moved towards the left, indicating the direction in which the carriage is to travel. In view of the symmetrical arrangement of the parts it will be apparent that the operation that takes place is similar to that which has been described.

Referring more particularly to the wiring diagram shown in Fig. 5, the various electrical connections will be explained, first in connection with an operation in which the machine is under the manual control of the operator to cut a right hand thread on the workpiece. Under these conditions, the operator moves the control arm 67 towards the right, starting the feeding movements, and then immediately pulls the arm 56 upwardly so as to bring the grinding wheel into engagement with the work. At the end of the feeding movement, determined by the stop 85, this stop swings arm 68 towards the right to break the circuit of the motor that drives and feeds the work, and the cam 64 at the same time causes the arm 59 to be moved downwardly again. The operator may then move the arm 67 towards the left to rapidly traverse the carriage back to its initial position, where it will be stopped automatically by stop 86.

At the start of these operations, the operator sets a switch controlling knob 92, see Fig. 1, which adjusts a coolant motor switch 93 to close a connection from wire 94 to wire 95, this setting providing a continuous flow of coolant from the coolant pump motor 96 after the machine starts operation. The operator also adjusts a control knob 97 which affects a master switch 98 so as to connect either the wheel head motor 99 or a second motor 100 in circuit. Motor 100 may drive the grinding wheel at a slow rate of speed while truing the wheel. This operation of the knob 97 adjusts the contacts of master switch 98 into the several positions shown in Fig. 6 so that the wheel head motor may be energized. The operator also turns knob 101 to the right hand feed manual control position, which affects master switch 102 so that its contacts will be adjusted to the positions shown in Fig. 6. He then presses the manual start switch 104. When switch 104 is closed it starts an oil pump motor 105 which is energized through connection 106 leading to one side of a transformer secondary 103. The other side of the secondary is connected through wire 108 across the lower switch blades of master switch 98, to wire 107, across closed switch 104, closed stop switch 109, connection 110, through the oil pump motor 105 and back to the transformer through connection 106. The primary winding 111 of the transformer mentioned is connected to wires 112 and 113 across one side of a three phase supply line.

When the oil pump motor starts it builds up pressure in a pressure switch 114 which then closes so as to complete a controlling circuit extending from one side of the secondary 103 through wire 115, switch energizing coil 116, wire 117, across closed switch 114 to wire 118, through normally closed overload coils 119 to wire 110, through closed stop switch 109, start switch 104, back to wire 107 which returns to the other side of the secondary through wire 108. Energization of the coil 116 closes the wheel head motor power switch 120, connecting the three phase power source through the cable connections 121 and the upper three switches of the master switch 98 to the wheel head motor 99, thus starting the grinding wheel.

The operator, having moved arm 56 upwardly to bring the wheel toward the work to a predetermined position, then swings the arm 67 towards the right, which closes switch 75, see Fig. 5, switches 75' and 76' remaining closed. Switch 75 completes a control circuit through a switch energizing coil 123 which closes the power switch 124 and energizes the work head motor 17 so that it will be driven in a forward direction and rotate the shaft 19 in the direction indicated by the arrow shown in Fig. 2. The circuit through the coil 123 is from the transformer secondary 103 through wire 108, master switch 98, wire 107, start switch 104, connections 126, 127, down to switch 76', through wire 128 to switch 75', across closed switch 75', through connection 129, through closed switch 75, to wire 130, then through connections 131, 132 and through the coil 123, then through return circuit 133, wire 134 and back through wire 106 to the transformer secondary. At this point it should be noted that either a movement of control arm 67 towards the left, or back to its normal position, or a movement of control arm 68 towards the right will open this circuit between the connections 127 and 131 and thus deenergize the switch controlling coil 123 so as to open the power switch 124.

The coolant pump motor 96 will be energized under these conditions, since the power switch 136 that controls it will be closed by the energization of winding 137 connected through wire 138 to one side of the transformer secondary and connected through wires 95, 94, 107 and 108.

After the carriage has moved the work towards the right to a predetermined stopping position, the pin 90 on arm 68 will be swung to the right by the stop 85, thus opening switch 75' and deenergizing the relay winding 123 so as to open the power switch 124. The latch arm 58 will be forced upwardly by the cam 64 and arm 56 switches downwardly to retract the grinding wheel from the work.

The operator then initiates a rapid traversing return movement of the carriage by swinging the arm 67 towards the left which closes switch 76. This completes a circuit through switch 76', which has remained closed, and through closed switch 76 so as to energize a switch controlling coil 140 controlling the reversing power switch 141 of the workhead motor 17. The coil 140 is connected to one side of the transformer secondary 103 through wires 106, 134 and 139. The circuit to the other side of the transformer is through connection 142 across a closed connection 143 through closed switch 76, connection 144, closed switch 76', connection 127, wire 126, start switch 104, connections 107 and 108 to the other side of the transformer. The motor 17 is thus driven in an opposite direction by the reversed phase relation produced by the connections to the power source when switch 141 is energized, and the work holding carriage moves to the left at a comparatively rapid rate of speed until the stop 86 moves the arm 68 towards the left and opens the switch 76', thus deenergizing the relay coil 140 and stopping the motor 17.

The motor 17 will be stopped at the end of this rapid traverse even though the traverse took place in a right hand direction instead of a left hand direction as intended, as might occur if the operator failed to provide proper gearing in the power transmission system. If the carriage moves to the right instead of the left, arm 68 through stop 85 will be swung to the right and eventually swing arm 67 to the right so as to open switch 76, after taking up the lost motion between these two arms.

By suitable operation of the control knob 101 the master switch 102 may be set so that the work carriage automatically initiates a return traverse movement at the end of its normal feeding stroke. For this operation, circuits are manually closed across points 145 and across points 146. At the end of the feeding stroke the arm 56 will swing down automatically, closing the switch 63 so that winding 140 of the power reversing switch 141 will be energized through connection 142, switch 63 instead of switch 143, across closed connection 145, connection 144, closed switch 76', connection 127, start switch 104 and connections 107 and 108, thus energizing switch 141 after deenergizing the switch 124.

While the form of apparatus herein described constitutes a preferred embodiment of the invention, it is to be understood that the invention is not limited to the precise form herein described, and that changes may be made therein without departing from the scope of the invention which is defined in the appended claims.

What is claimed is:

1. In a machine tool, a base, a carriage movable thereon, carriage feed means including adjustable gearing for feeding the carriage in a selected direction, means for driving said feed means, spaced stops on said carriage, a control member manually operable in one direction or the other from a normal position, a pair of electric circuits for controlling the operation of said drive means, a pair of switches one for each of said circuits and arranged for selective operation according to the direction of movement of said control member, a stop controlled member having a lost motion connection to said control member and movable from a normal position in one direction or the other, switch means selectively operable according to the direction of movement of said stop controlled member, said switch means selectively controlling said circuits and so coordinated with said pair of switches that similar movement of said control member and stop controlled member in either direction from normal under the control of said stops will deenergize the circuit controlling said drive means.

2. In a machine tool, a base, a carriage movable thereon, carriage feed means including adjustable gearing for feeding the carriage in a selected direction, reversible means for driving said feed means, spaced stops on said carriage, a control member manually operable in one direction or the other from a normal position, a pair of electric circuits for controlling and reversing said drive means, a pair of start switches one for each of said circuits and arranged for selective operation according to the direction of movement of said control means, a stop controlled member having a lost motion connection to said control member and movable from a normal position in one direction or the other, switch means selectively operable according to the direction of movement of said stop controlled member, said switch means respectively having a series connection to the respective ones of said switches to selectively control said circuits so that similar movement of said control member and stop controlled member towards normal position under the control of said stops will deenergize the circuit controlling said drive means, and movement of said stop controlled member alone in the opposite direction will also deenergize the circuit controlling said drive means.

3. In a machine tool, a base, a carriage movable thereon, carriage feed means including adjustable gearing for feeding the carriage in a selected direction, a reversible motor for operating said feed means, spaced stops on said carriage, a control lever operable in one direction or the other from a normal position, a pair of electric circuits for selecting the direction of operation of said motor, a pair of switches one for each of said circuits and arranged for selective operation by said control lever, a stop controlled arm having a lost motion connection to said control lever and movable from a normal position in one direction or the other, a second pair of switches, normally closed and selectively operable according to the direction of movement of said stop controlled arm, said second pair of switches selectively controlling said circuits and each connected in series with one of said first pair of switches so that movement of said stop controlled arm in one direction under the control of one of said stops will deenergize the circuit controlling said motor.

4. In a thread grinding machine having a base, a movable work carriage and carriage feed means having provision for reversing the direction of carriage feed, an electric motor for operating said feed means, spaced stops on said carriage, a manually controlled lever operable from a normal position in clockwise and counterclockwise directions, a pair of electric circuits controlling the operation of said motor, a pair of switches selectively energized according to the direction of movement of said lever, said switches selectively controlling said circuits, an automatically operable arm having a lost motion connection to said lever such that normal manual operation of the lever is without effect on said arm, said arm being movable from a normal position in one direction or the other by said stops, a pair of switches selectively operable by said arm according to the direction of arm movement, one arm controlled switch controlled by movement of the arm in one direction having a series connection with the switch controlled by lever movements in the opposite direction to insure feed stoppage regardless of the direction in which the arm is moved by the stops.

KONRAD RAUCH.